(12) United States Patent
Shimada (10) Patent No.: US 6,343,194 B1
(45) Date of Patent: Jan. 29, 2002

(54) PRINTER CONTROLLER AND PRINTER AS WELL AS RECORDING METHOD FOR CONTROLLING SPECIFIC CONSUMABLES USED THEREFOR

(75) Inventor: Hirokatsu Shimada, Machida (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/606,143

(22) Filed: Jun. 29, 2000

(30) Foreign Application Priority Data

Jul. 2, 1999 (JP) ............................................. 11-189681

(51) Int. Cl.[7] ............................. G03G 15/01; H04N 1/60
(52) U.S. Cl. ............................... 399/28; 347/5; 358/1.9; 399/54
(58) Field of Search ...................... 399/28, 54; 347/5, 347/6, 7, 19; 358/1.9

(56) References Cited

FOREIGN PATENT DOCUMENTS

| JP | 5-57908 | * | 3/1993 |
| JP | 6-971 | * | 1/1994 |
| JP | 10-129012 | | 5/1998 |
| JP | 10-329337 | * | 12/1998 |
| JP | 11-115207 | | 4/1999 |
| JP | 11-170561 | | 6/1999 |

* cited by examiner

Primary Examiner—Joan Pendegrass
(74) Attorney, Agent, or Firm—McDermott, Will & Emery (57) ABSTRACT

Technology for controlling consumables for color printers to prevent the mere recording agent of a specific color from being excessively consumed. In this technology, when the printer is used, the system detects the residual ink volume of each color, and replaces an original color with another color by performing color conversion (image synthesis) on an image data by means of a prescribed processing method if a biased ink consumption exceeds a prescribed value, thus restricting the use of the particular ink before it is used up.

6 Claims, 7 Drawing Sheets

BINALIZATION

REGION
EXTRACTION
AND
AREA DECISION

FIG. 7D

COLOR
CONVERSION

PRINTER CONTROLLER AND PRINTER AS WELL AS RECORDING METHOD FOR CONTROLLING SPECIFIC CONSUMABLES USED THEREFOR

This application is based on Japanese Patent Application No. 11-189681 filed on Jul. 2, 1999, the contents of which are hereby incorporated by reference.

BACKGROUND OF THE INVENTION

1. Field of the Invention

The invention relates to a control technology for specific consumables used in color printers. More specifically, this invention relates to a recording technology adapted for the control of consumables such as, for example, ink for inkjet color printers and toner for electrophotographic color printers.

2. Description of Related Art

In a multi-color printer, recording agents of plural colors are used as consumables. For example, inks of plural colors are used in an inkjet color printer and toners of plural colors are used in an electrophotographic color printer.

In these color printers, however, when they are used, such a situation often arises where only a recording agent, such as ink or toner, of a certain specific color is used excessively and the printer cannot print that particular color when it is really needed because of the lack of such color agent.

Moreover, in this case, if only the recording agent of that particular color is replenished, unbalance in an image may result from a difference in durability between the replenished new recording agent and unreplenished other recording agents.

SUMMARY OF THE INVENTION

This is an object of this invention to provide a control technology for consumables of color printers that can prevent the excessive consumption of only a recording agent of a certain specific color.

According to an aspect of the invention, a controller of a printer that forms a multi-color image by using recording agents of plural colors comprises detection means for detecting the residual amount of recording agent of each color, calculation means for calculating a biased consumption of recording agent based on the detected residual amount of recording agent of each color, and color conversion means for replacing a color of a recording agent corresponding to the minimum residual amount in the detected residual amount of recording agent of each color with another color when the calculated biased consumption of recording agent is not less than a first prescribed value.

According to another aspect of the invention, a printer that forms a multi-color image by using recording agents of plural colors comprises detection means for detecting the residual amount of recording agent of each color, calculation means for calculating a biased consumption of recording agent based on the detected residual amount of recording agent of each color, and color conversion means for replacing a color of a recording agent corresponding to the minimum residual amount in the detected residual amount of recording agent of each color with another color when the calculated biased consumption of recording agent is not less than a first prescribed value.

According to still another aspect of the invention, a recording method for controlling a specific consumables used for a controller of a printer or a printer that forms a multi-color image by using recording agents of plural colors as consumables comprises the steps of detecting the residual amount of recording agent of each color, calculating a biased consumption of recording agent based on the detected residual amount of recording agent of each color, and replacing a color of a recording agent corresponding to the minimum residual amount in the detected residual amount of recording agent of each color with another color when the calculated biased consumption-of recording agent is not less than a first prescribed value.

According to a further aspect of the invention, a computer program product for enabling a computer to execute a recording method for controlling a specific consumables used for a controller of a printer or a printer that forms a multi-color image by using recording agents of plural colors as consumables comprises the controls of detecting the residual amount of recording agent of each color, calculating a biased consumption of recording agent based on the detected residual amount of recording agent of each color, and replacing a color of a recording agent corresponding to the minimum residual amount in the detected residual amount of recording agent of each color with another color when the calculated biased consumption of recording agent is not less than a first prescribed value.

DESCRIPTION OF THE PREFERRED EMBODIMENTS

Various embodiments of this invention will be described below by reference to the accompanying drawings mentioned above.

Figure 1:
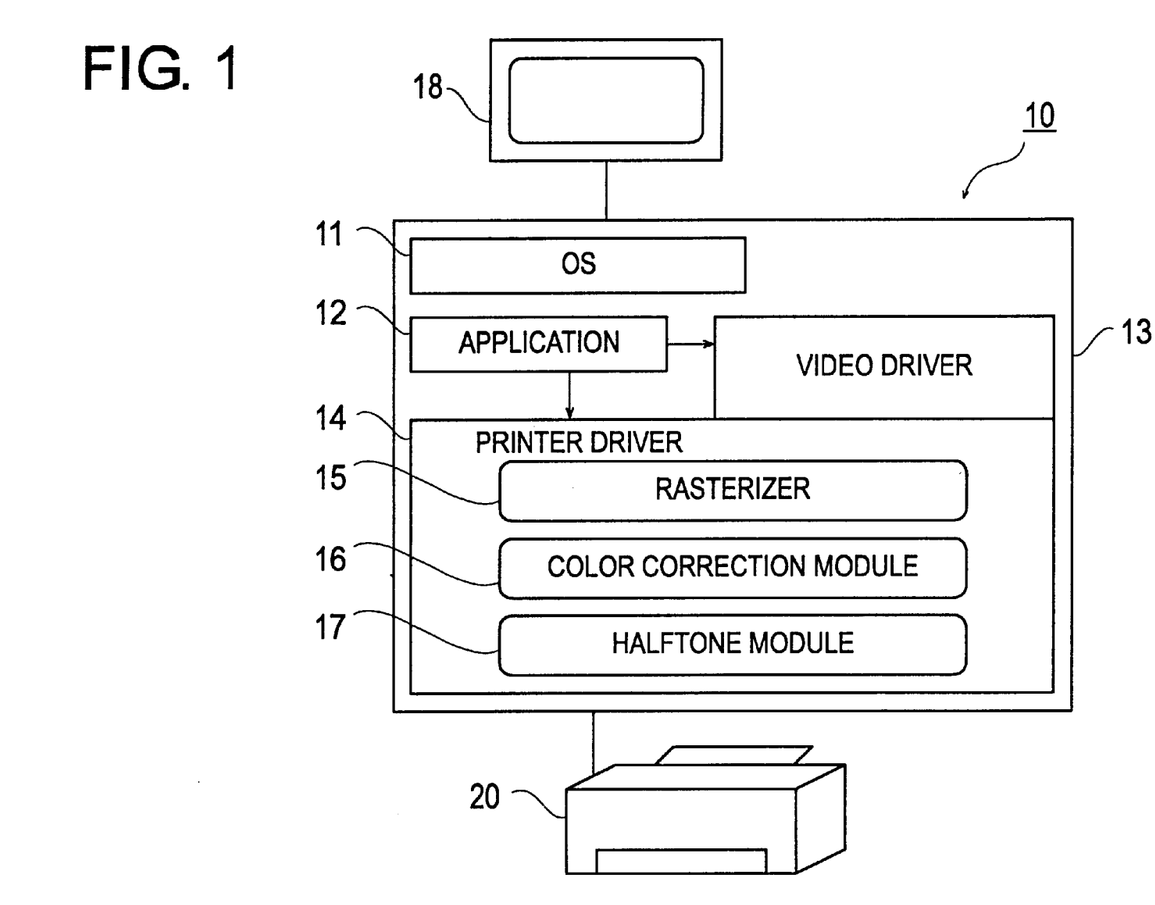
FIG. 1 is a drawing showing the overall construction of a computer system to which this invention is applied.

FIG. 1 is a drawing showing the overall construction of a computer system to which this invention is applied.

This system has a host computer 10 and a color printer (hereinafter simply called "printer") 20, both of which are interconnected to be able to communicate with each other. For example, the host computer 10 is a personal computer or a workstation, and the printer 20 is an inkjet printer or an electrophotographic printer. A color image data prepared, edited and processed by the host computer 10 is transmitted to the printer 20, and printed out.

Although it shows here a system with one host computer 10 connected with one printer 20, the invention is not limited to this type. It can be a system with one printer or a plurality of printers connected with a plurality of computers so that they can communicate with each other via a network, for example.

In the following description, an inkjet printer is used as an example of the printer 20.

The host computer 10 has an OS (operating system) 11, under which image outputting application software 12, video driver 13 and printer driver 14 operate.

The video driver 13 receives instructions from the image output-application software 12 to display in a prescribed format a display data on a monitor (display device) 18.

The printer driver 14 has a rasterizer 15, color correction module 16, and a halftone module 17 as a basic means for obtaining a binary data necessary for the drawing.

The color image data is divided into three colors, i.e., R (red), G (green), and B (blue), by the rasterizer 15, to produce a bitmap date of RGB multi-gradation (e.g., 256 gradations) rasterized for each color. This image data converted by the rasterizer 15,is called a raster data.

In order to make this raster data correspond with printing colors, the color correction module 16 is operated on this raster data to execute a color correction process. As a result, the RGB multi-gradation bitmap data will be converted into a YMCK multi-gradation bitmap data for printing in Y (yellow), M (magenta), C (cyan) and K (black) printing inks.

Then, the halftone module 17 is operated on the YMCK multi-gradation bitmap data to apply a halftone process such as the error diffusion method or the dither method in order to express density gradation. As a result, the distribution or layout of density colors on bitmap will be determined for each color and bitmaps each of which is binary (density binary data tables) will be created in order to convert original image density into printing density.

Figure 2:
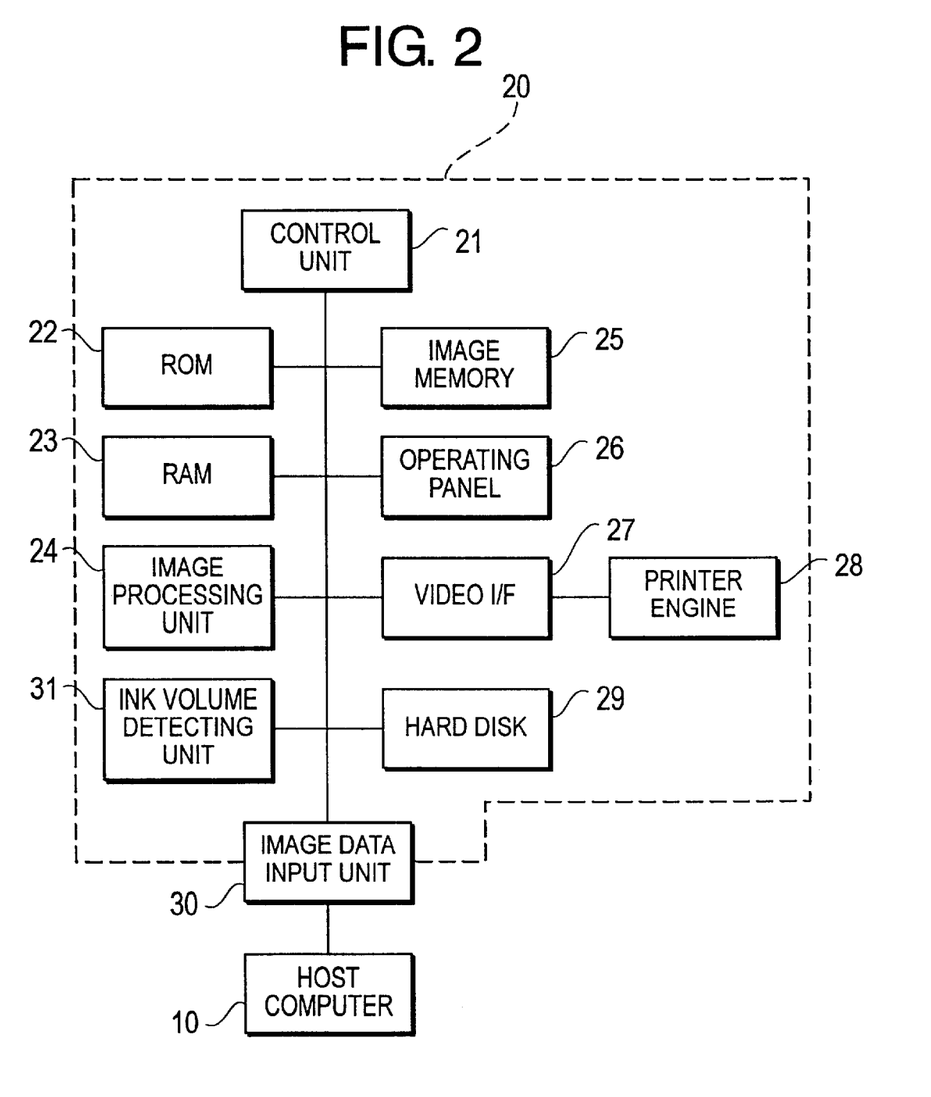
FIG. 2 is a block diagram showing the construction of a printer shown in FIG. 1.

FIG. 2 is a block diagram showing the constitution of the printer 20.

This printer 20 consists of a control unit 21, a ROM 22, a RAM 23, an image processing unit 24, an image memory 25, an opera ting panel 26, a video interface (I/F) 27, a printer engine 28, a hard disk 29, an image data input unit 30, and an ink volume detecting unit 31.

The printer 20 is connected with the host computer 10 via the image data input unit 30, and is capable of communicating with the host computer 10 to exchange information. Image data (high-density bitmap data and low-density bitmap data) ultimately prepared by the host computer 10 are inputted into the printer 20 via the image data input unit 30.

The control unit 21 is designed to control the operation of the printer 20 and perform its function by controlling the operation of each part of the printer 20 through execution of programs stored in the ROM 22. The control unit 21 is essentially composed of a CPU.

The image processing unit 24 performs various image processes such as discrimination of character and photograph areas, edge enhancement, smoothing process, intermediate gradation process (dither method, error diffusion method, etc.), and so on.

The image memory 25 temporarily stores image data received from the host computer 10.

The hard disk 29 stores image data received from the host computer 10. The hard disk 29 also has an area that is accessible from the host computer 10.

The ROM 22 keeps programs that are to be executed at the control unit 22 and the RAM 23 temporarily stores data except image data.

The video interface 27 is an interface for transferring data to the printer engine 28 which is connected thereto, at the time of printing out the received image data.

The printer engine 28 stores ink of each color of YMCK, and prints in color the received image data according to the contents of a print job on a printing paper.

A user can designate the operation of the printer 10 through the operating panel 26. In addition to various operating keys, a operating panel 26 is equipped with a display unit where a message can be displayed.

The ink volume detecting unit 31 detects the residual volume of ink for each color of YMCK in an ink case, and transmits the detection results to the control unit 21. In some cases, the results of detecting the residual volume of ink are transmitted to the host computer 10 as well.

Figure 3:
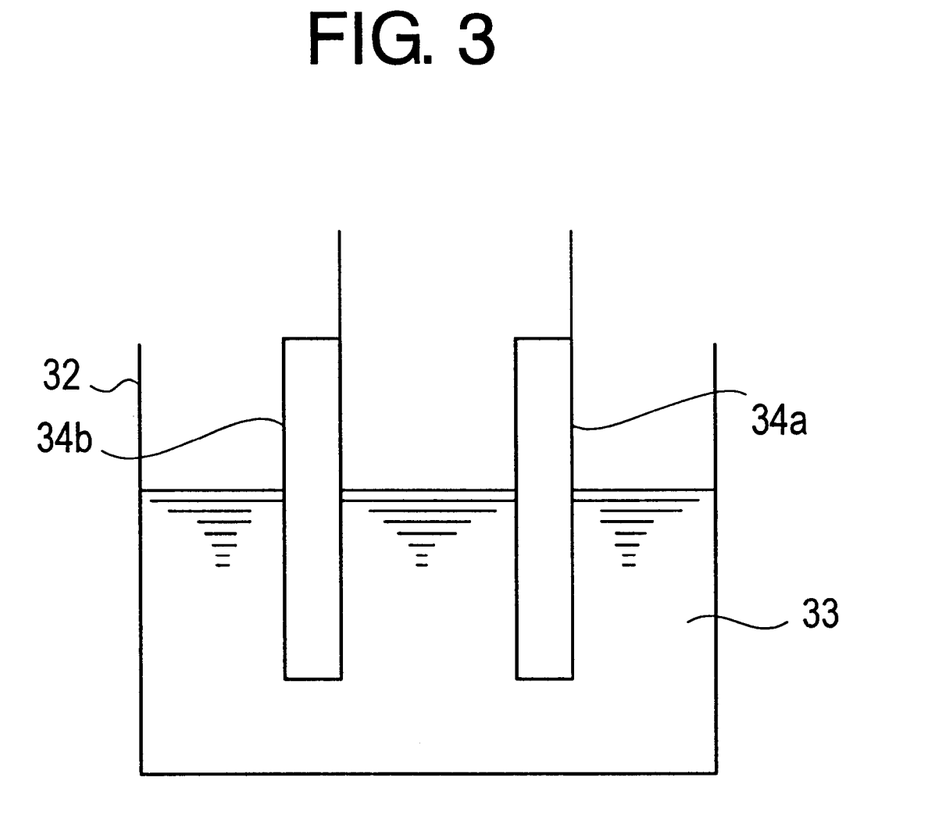
FIG. 3 is a explanatory drawing of one example of an ink volume detection method.

FIG. 3 is an explanatory drawing of one example of an ink volume detection method.

Two electrodes 34a and 34b are immersed into the ink 33 of each color of YMCK in each ink case 32, and an AC voltage is applied thereto. When ink is discharged, the ink level drops and causes a change in the applied voltage, thus allowing the residual volume of ink to be detected based on that change.

The ink volume in the ink case can be detected not only by the above-mentioned physical means (detection based on conductivity by an electrical means), but also by other physical means, such as detection from the light transmittance by using an optical means or detection by counting ejected ink dots and subtracting the counts from the initial ink volume. In case of an electrophotographic printer, the residual volume of toner can be detected by other appropriate means.

This system is so designed that when the printer 20 is used, in order to prevent the mere ink of a certain specific color from being excessively consumed, a color conversion process (image synthesis) is performed on an image data, before its output, by means of a prescribed processing method to be described later, when there occurs a biased ink consumption beyond a fixed volume. In other words, before it runs out of the ink of a certain specific color, it is adapted to impose restrictions on the use of that ink, specifically, to replace that color with another color.

Figure 4:
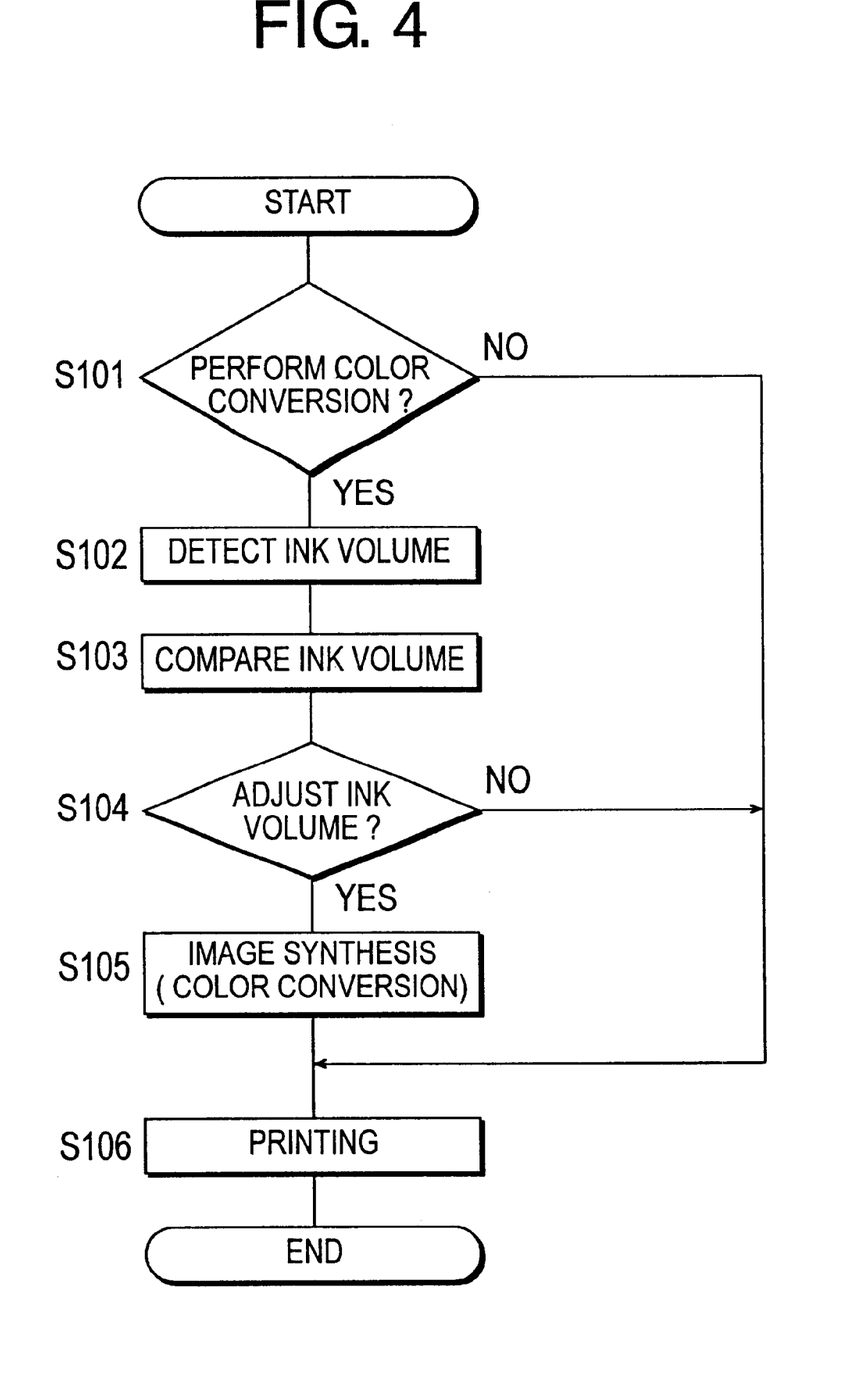
FIG. 4 is a flow chart showing one example of the operation of this system for preventing a biased ink consumption.

FIG. 4 is a flow chart showing one example of the operation of this system for preventing a biased ink consumption. What is described below is a case where the color conversion is performed on the host computer 10 side (printer driver 14).

First, it is judged whether or not the user has set the system so as to replace a color that has a small residual volume of ink with another color when a large bias of ink volume exists (S101). If no such setting has been made (S101:NO), the system transmits an image data with its original image intact, without performing color conversion, to the printer 20 to let the printer 20 execute printing (S106).

On the other hand, if such replacement setting has been made (S101:YES), the system detects the residual volume of the ink 33 for each color of YMCK in the ink case 32 at the ink volume detecting unit 31 (S102). The detected data is transmitted to the printer driver 14 of the host computer 10.

Figure 5:
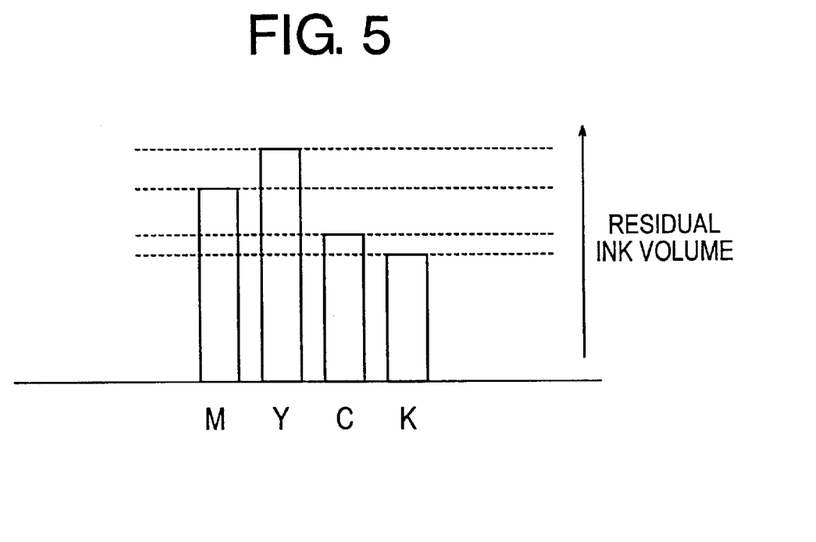
FIG. 5 is a explanatory drawing of an example of ink volume comparison.

The printer driver 14 receives the residual ink volume data for each color of YMCK from the printer 20, and makes a comparison of ink volumes (S103). Specifically, it determines the ink color that corresponds to the maximum residual volume Rmax and the ink color that corresponds to the minimum residual volume Rmin, and calculates a difference in the residual ink volumes of both colors (Rmax−Rmin). This difference in the residual ink volumes (Rmax−Rmin) is made a data of a biased ink consumption. In the example shown in FIG. 5, the ink color that corresponds to the maximum residual volume Rmax is yellow (Y) and the ink color that corresponds to the minimum residual volume Rmin is black (K), so that the difference between the residual volume of the yellow ink (maximum residual volume Rmax) and the residual volume of the black ink (minimum residual volume Rmin), i.e., (Rmax−Rmin), is calculated.

Then, it is judged whether or not to make an adjustment of ink volume (S104). Specifically, the difference in the residual ink volumes (Rmax−Rmin) calculated at the step S103 is compared with a prescribed reference value (threshold value) Rth to see whether or not the former is not less than the latter (i.e., Rmax−Rmin≧Rth).

If the difference in the residual ink volumes (Rmax−Rmin) is not less than the reference value Rth (i.e., Rmax−Rmin≧Rth) (S104:YES), image synthesis (color conversion) is performed (S105) and then image data thus obtained is transmitted to the printer 20 to let the printer 20 execute printing (S106). In the color conversion, the ink color corresponding to the minimum residual volume Rmin becomes the color that is converted to another color for restrictions on use. For example, in case of the example shown in FIG. 5, the use of black (K) ink is restricted.

Figure 6:
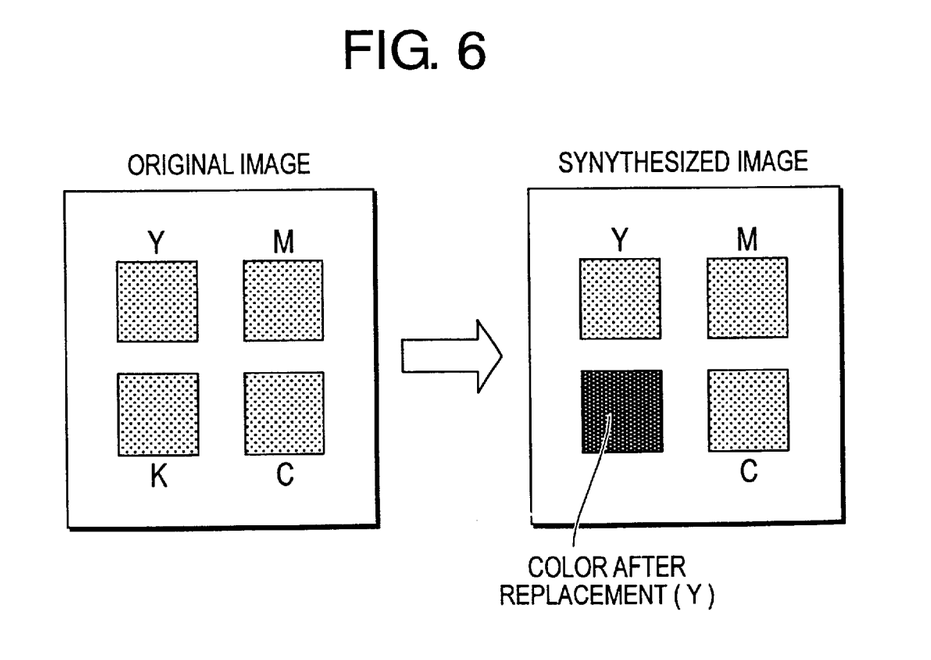
FIG. 6 is a explanatory drawing of one example of an color conversion method.
Figure 7A:
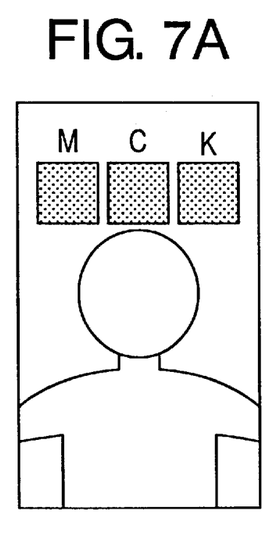
FIGS. 7A through 7D are a explanatory drawing of another example of the color conversion method.
Figure 7B:
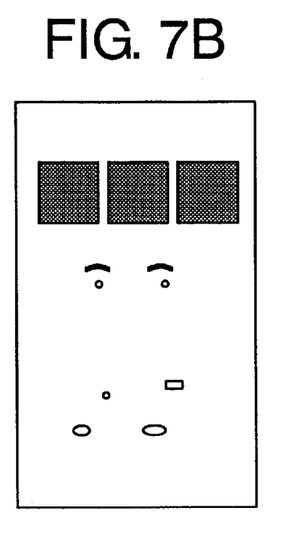
Figure 7C:
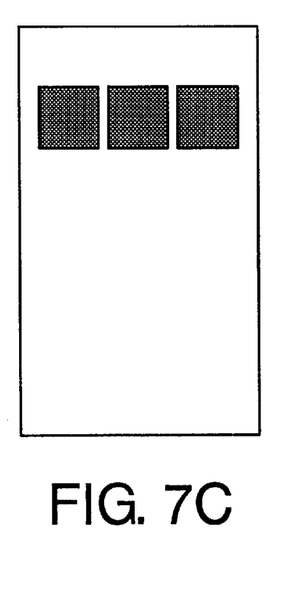
Figure 7D:
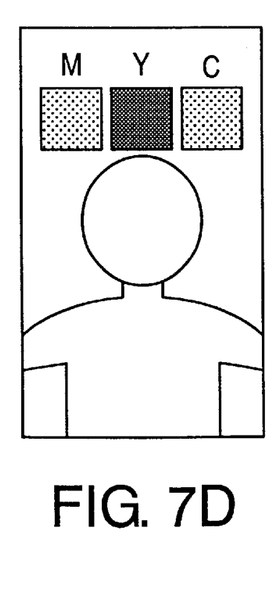

While there are various methods of color convention (replacement), the simplest is the one shown in FIG. 6. In this method, the ink color of every pixel data in the original image data that corresponds to the minimum residual volume Rmin is simply replaced with the ink color that corresponds to the maximum residual volume Rmax. In case of FIG. 6, the color of the pixel region specified to be black (K) is replaced with yellow (Y).

On the contrary, if the difference in the residual ink volumes (Rmax−Rmin) is less than the reference value Rth (i.e., Rmax−Rmin<Rth) (S104:NO), the original image data is transmitted to the printer 20 without performing image synthesis (color conversion) to let the printer 20 execute printing (S106).

A series of processes (S103–S105) shown in FIG. 4 can be implemented on the printer 20 side (control unit 21).

A more practical method of color conversion (replacement) is the one shown in FIG. 7. In this method, if a photographic image exists mixed with other images such as color patches or characters, the photographic image shall not be color-converted and only certain color patches or characters that meet a certain condition are color-converted. More specifically, binalization is performed on an original image (see FIG. 7A) to convert it into a binary image, differentiation is performed on the obtained binary image (see FIG. 7B) to detect edges, then extracting regions that are surrounded by the edges, not less than a prescribed area, and of a uniform color of the mere ink whose use is restricted (see FIG. 7C) to execute color conversion (see FIG. 7D). In case of the example shown in FIG. 7, the color of the color patch region specified as black (K) is replaced with yellow (Y). In this case, colors mixed with some black (K) are printed as they are without any conversion.

Figure 8:
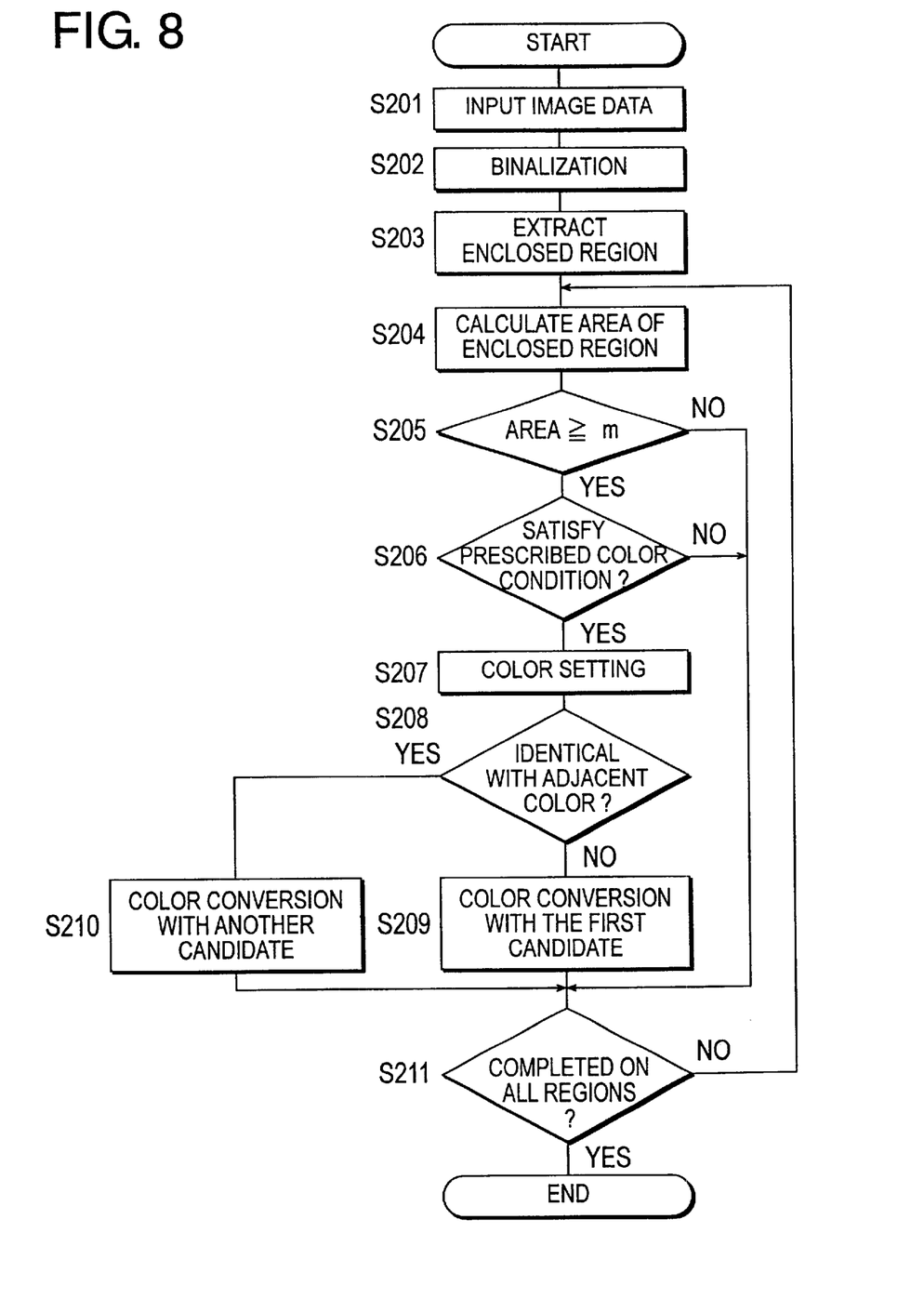
FIG. 8 is a flow chart showing one example of the practical procedure of a color conversion process according to the method shown in FIG. 7.

FIG. 8 is a flow chart showing one example of the practical procedure of such color conversion. This color conversion process corresponds to the step S105 of the flow chart shown in FIG. 4 and it is assumed here to be executed by the control unit 21 of the printer 20.

When the image data input unit 30 receives a bit-mapped image data (original image) from the host computer 10 (S201), the control unit 21 of the printer 20 converts the original image to a binary image by using a prescribed threshold value to extract the pixels that have densities not less than a certain value (S202). It further detects edges by performing a differentiation process on the obtained binary image to extract all the enclosed regions surrounded by the edges (S203).

It then calculates the area of one enclosed region of all the extracted enclosed regions (S204), and makes a judgment whether or not the calculated area is not less than a prescribed value of m (S205).

If the area is less than the prescribed value of m (S205:NO), the system advances immediately to the step S211 and performs no color conversion for said enclosed region.

On the contrary, if the area is not less than the prescribed value of m (S205:YES), it further makes a judgment whether or not the specified color for said enclosed region is a uniform color consisting of only the color of the ink whose use is restricted (S206).

As a result of this judgment, if the specified color is not a uniform color consisting of only the color of the ink whose use is restricted, in other words, either if the specified color is not the color of the ink whose use is restricted, or if it is the color of the ink whose use is restricted but it is not a uniform color and has a certain density distribution (S206:NO), the system advances directly to the step S211 and performs no color conversion for said enclosed region.

On the contrary, if the specified color is a uniform color consisting of only the color of the ink whose use is restricted, in other words, if the specified color is only the color of the ink whose use is restricted, and if the internal density of the enclosed region is uniform (S206:YES), a color setting (re-specification) is performed for said enclosed region (S207) in order to execute color conversion. In this case, for example, it sets as the first candidate the color of the ink with the maximum residual volume, i.e., the ink color that corresponds to the maximum residual volume Rmax. It then makes a judgment what is the color (adjacent color) of the region that is adjacent to said enclosed region whose color is to be replaced, and whether or not the color (first candidate) set at the step S207 is identical with that adjacent color (S208).

As a result of this judgement, if the set color (first candidate) is different from the adjacent color (S208:NO), it replaces the color of said enclosed region with the set first candidate color (S209), and advances to the step S211.

On the other hand, if the set color (first candidate) is identical with the adjacent color (S208:YES), the reproduced image becomes very difficult to see, so that the system replaces the color of said enclosed region with the color of another candidate (second candidate) (S210), and advances to the step S211. The second candidate is set to be the color of the ink with the second largest residual volume, for example.

After conducting one by one the processes of the steps S204–S210 on all the enclosed regions that has been extracted (S211:YES), the system completes the series of color conversion.

Incidentally, in setting (respecifying) the color, in addition to the method of deciding the candidate based on the residual ink volume as mentioned above, it is also possible to have a color conversion table set in advance in accordance with the color of the ink whose use is restricted, and decide the candidate based on that color conversion table.

A series of processes (S202–S211 except S201) shown in FIG. 8 can be done on the host computer 10 side (printer driver 14).

Therefore, according to these embodiments, when the printer 20 is used, the system detects the residual ink volume of each color, and replaces the original color with another color by performing color conversion (image synthesis) on the image data by means of a prescribed processing method (see FIG. 6 through FIG. 8) if a biased ink consumption exceeds a prescribed value, thus restricting the use of the particular ink before it is used up, so that an excessive consumption of a particular color can be prevented. This will enable us to prevent the problem of being unable to print a particular color when it is really needed and to eliminate the problem of unbalance in an image due to a difference in durability between a replenished color and unreplenished colors caused by replenishing only a certain specific ink.

Moreover, according to the method shown in FIG. 7 and FIG. 8, color conversion is performed for only those color patches or characters that meet a certain condition, specifically, it is so designed to identify an enclosed region whose area is not less than a prescribed value of m and whose specified color is a uniform color consisting only of the color of the ink whose use is restricted, and perform color conversion for only said enclosed region, so that it can save ink practically without affecting photographic images or images of intermediate colors of mixed complex colors.

Further, in this case, the reproduced images are always easily recognizable since the color after replacement is chosen to be different from adjacent colors by first checking the adjacent colors.

Although the color conversion is done only for a region of the specific ink color that corresponds to the minimum residual volume, whose use is restricted, in the above-mentioned color conversion method, there is another method wherein a color scheme of the entire image is restructured by using colors other than the color of the ink whose use is restricted, for printing.

The present invention is applicable not only to the inkjet color printer that uses ink but also applicable to the electrophotographic color printer that uses toner, for example, as a matter of course.

Furthermore, if a computer (CPU) is used as mentioned above, it is also possible to store a program describing the above-mentioned procedures (see FIG. 4, FIG. 8, etc.) into a recording medium (such as floppy disk, CD-ROM, etc.) that can be read by computers and operate the host computer 10 and/or the printer 20 by such a recording medium.

The computer program product mentioned in the claims includes the program itself, the recording medium in which the program is recorded, and the device that operates based on the installed program.

What is claimed is:

1. A controller of a printer that forms a multi-color image by using recording agents of plural colors, comprising:
    detection means for detecting the residual amount of recording agent of each color;
    calculation means for calculating a biased consumption of recording agent of each color;
    color conversion means for replacing a color of a recording agent corresponding to the minimum residual amount in the detected residual amount of recording agent of each color with another color when the calculated biased consumption of recording agent is not less than a first prescribed value;
    extraction means for extracting an enclosed region of an original image; and
    judging means for judging whether or not the area of the extracted enclosed region is not less than a second prescribed value, wherein
    said color conversion means, when the calculated biased consumption of recording agent is not less than the first prescribed value, converts a specified color of the extracted enclosed region to another color if the area of the extracted enclosed region is not less than the second prescribed value and if the specified color of the extracted enclosed region is a uniform color consisting only of the color of the recording agent corresponding to the minimum residual amount.

2. A controller of a printer that forms a multi-color image by using recording agents of plural colors, comprising:
    detection means for detecting the residual amount of recording agent of each color;
    calculation means for calculating a biased consumption of recording agent of each color; and
    color conversion means for replacing a color of a recording agent corresponding to the minimum residual amount in the detected residual amount of recording agent of each color with another color when the calculated biased consumption of recording agent is not less than a first prescribed value, wherein
    said color conversion means, in replacing the color of the recording agent corresponding to the minimum residual amount with another color, makes a comparison with an adjacent color and performs the replacement with a different color from the adjacent color.

3. A controller of a printer that forms a multi-color image by using recording agents of plural colors, comprising:
    detection means for detecting the residual amount of recording agent of each color;
    calculation means for calculating a biased consumption of recording agent of each color;
    color conversion means for replacing a color of a recording agent corresponding to the minimum residual amount in the detected residual amount of recording agent of each color with another color when the calculated biased consumption of recording agent is not less than a first prescribed value; and
    setting means for setting whether or not to replace the color of the recording agent corresponding to the minimum residual amount with another color, wherein
    said color conversion means performs no replacement of color when it is set so as not to perform the replacement of color by aid setting means.

4. A printer that forms a multi-color image by using recording agents of plural colors, comprising:
    detection means for detecting the residual amount of recording agent of each color;
    calculation means for calculating a biased consumption of recording agent based on the detected residual amount of recording agent of each color;
    color conversion means for replacing a color of a recording agent corresponding to the minimum residual amount in the detected residual amount of recording agent of each color with another color when the calculated biased consumption of recording agent is not less than a first prescribed value;
    extraction means for extracting an enclosed region of an original image; and
    judging means for judging whether or not the area of the extracted enclosed region is not less than a second prescribed value, wherein
    said color conversion means, when the calculated biased consumption of recording agent is not less than the first prescribed value, converts a specified color of the extracted enclosed region to another color if the area of the extracted enclosed region is not less than the second prescribed value and if the specified color of the extracted enclosed region is a uniform color consisting only of the color of the recording agent corresponding to the minimum residual amount.

5. A printer that forms a multi-color image by using recording agents of plural colors, comprising:

detection means for detecting the residual amount of recording agent of each color;

calculation means for calculating a biased consumption of recording agent based on the detected residual amount of recording agent of each color; and color conversion means for replacing a color of a recording agent corresponding to the minimum residual amount in the detected residual amount of recording agent of each color with another color when the calculated biased consumption of recording agent is not less than a first prescribed value, wherein said color conversion means, in replacing the color of the recording agent corresponding to the minimum residual amount with another color, makes a comparison with an adjacent color and performs the replacement with a different color from the adjacent color.

6. A printer that forms a multi-color image by using recording agents of plural colors, comprising:

detection means for detecting the residual amount of recording agent of each color;

calculation means for calculating a biased consumption of recording agent based on the detected residual amount of recording agent of each color;

color conversion means for replacing a color of a recording agent corresponding to the minimum residual amount in the detected residual amount of recording agent of each color with another color when the calculated biased consumption of recording agent is not less than a first prescribed value; and setting means for setting whether or not to replace the color of the recording agent corresponding to the minimum residual amount with another color, wherein said color conversion means performs no replacement of color when it is set so as not to perform the replacement of color by said setting means.

* * * * *